US000001888H

United States Statutory Invention Registration [19]

[11] Reg. Number: H1,888

Quartarone et al.

[45] Published: Oct. 3, 2000

[54] PROCESS FOR APPLYING HIGH APPLICATION-TEMPERATURE COATING TO HEAT-SENSITIVE ALUMINUM ALLOYS

[75] Inventors: James R. Quartarone, Newport; Kenneth E. Barthelemy, Hope; William M. Cicchelli, Saunderstown; George V. Morris, East Providence, all of R.I.

[73] Assignee: The United States of America as represented by the Secretary of the Navy, Washington, D.C.

[21] Appl. No.: 08/038,369

[22] Filed: Mar. 29, 1993

[51] Int. Cl.[7] ..... D05D 3/02

[52] U.S. Cl. ..... 427/318; 427/195; 427/318; 427/386; 427/388.1; 427/388.2

[58] Field of Search ..... 427/486, 195, 427/318, 386, 388.1, 388.2

[56] References Cited

U.S. PATENT DOCUMENTS

| | | | |
|---|---|---|---|
| 4,048,355 | 9/1977 | Sakayori et al. | 427/486 |
| 4,104,416 | 8/1978 | Parthasarathy et al. | 427/195 |
| 4,481,239 | 11/1984 | Eckner | 427/486 |
| 4,685,985 | 8/1987 | Stueke | 427/195 |
| 4,865,882 | 9/1989 | Okano et al. | 427/195 |

*Primary Examiner*—Peter A. Nelson
*Attorney, Agent, or Firm*—Michael J. McGowan; Prithvi C. Lall; Michael F. Oglo

[57] ABSTRACT

A process is provided for coating a given surface of a heat sensitive metal article (e.g., thermally massive aluminum) with a high-cure-temperature-coating-forming-powder. A first oven heating step elevates the metal article's temperature to a predetermined preheat cycle high-limit-of-heat-load-temperature. After a first predetermined period of time, the metal alloy article is withdrawn from the oven. A high-cure-temperature-coating-forming-powder is then sprayed onto the given surface of the metal article. The spraying, comprising first and second spray sequences, is initiated essentially immediately after withdrawal of the metal article from the oven. The first spray sequence is a single group of spray passes that applies a coating layer to fill the pores in the given surface with heat melted high-cure-temperature-coating-forming-powder. The second spray sequence builds up the total thickness of coating. A second oven heating step elevates the metal article's temperature to a predetermined cure cycle high-limit-of-heat-load-temperature for a second predetermined period of time.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR APPLYING HIGH APPLICATION-TEMPERATURE COATING TO HEAT-SENSITIVE ALUMINUM ALLOYS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to high application-temperature coatings, and more particularly to a process of applying a protective, high-cure-temperature coating to thermally massive heat-sensitive aluminum alloy components without degrading the mechanical properties of the components.

(2) Description of the Prior Art

It has long been known and customary in the art to apply protective coatings on diverse types of structural substrates. Coating application methods generally include liquid dispersions of synthetic resins via surface application or immersion, or dry powder coating via electrostatic powder spray application. The choice of synthetic resins for use as a protective coating is dependent upon both the nature of the substrate to be coated and the nature of the intended application of the coated substrate. For effective protection, the chosen synthetic resin and application method must produce a continuous coating on the substrate of sufficient thickness and hardness to isolate the substrate from the environment(s) from which the substrate requires protection. Aluminum is an excellent selection for a structural material where high strength-to-weight ratios are desired/required. Heat treated six thousand (6000), seven thousand (7000) series and A356 aluminum alloys (containing 90–95% aluminum) are used in torpedo applications because of their high strength and relatively light weight. Traditionally, however, strength considerations are often given more consideration than corrosion resistance characteristics during design and material selection. Accordingly, the designed for strength-to-weight ratios are often undermined by corrosion when the chosen structural component is exposed to a marine environment for any length of time.

A variety of post-fabrication processes are currently used in an attempt to improve the corrosion resistance of torpedo structural elements made from series 6000, 7000 or A356 aluminum alloys. Anodizing, painting and chemical film conversion are the common surface treatments which improve corrosion resistance by isolating/separating the aluminum alloy from the corrosive environment. Powder epoxy coating is currently one of the most effective and practical surface coating/treatment that can be applied to an aluminum alloy.

The best corrosion resistance performance is generally obtained by using the highest-cure-temperature powder epoxies that are currently available. While small or thin aluminum parts can successfully be powder coated using standard commercial application techniques, "large thermally-massive" aluminum parts (parts with heavy thick-walled sections) cannot. Current methods of effectively applying such high-cure-temperature coatings to a thermally-massive part require that the part to be coated be heated in excess of temperatures at which the aluminum alloy begins to lose tensile/yield strength. Further, parts that are considered to be thermally massive act as a significant heat sink such that "normal" cold application of powder coatings followed by an oven cure are ineffective. During a cure cycle, the mass of a cold aluminum part draws so much heat away from the coating that it does not allow the coating a chance to flow before curing. A coating film applied this way would remain porous, discontinuous and rough. Note that there is no problem powder coating large steel components (which may be "large thermally-conductive masses") because steel is capable of withstanding much higher temperatures without degradation of structural properties.

For the purposes of this description, a "thermally-massive" aluminum component is defined as any component large enough or shaped in such a way as to draw heat away from the applied coating during a post spray cure. Some examples of thermally massive aluminum components as they apply to a torpedo structure are listed in Table 1 below.

TABLE 1

Examples of Thermally Massive Aluminum Components Used in Torpedo Structures

| GENERAL SHAPE/ DESCRIPTION | APPROX. DIMENSIONS | SECTION OR WALL THICKNESS | APPROX. WEIGHT |
|---|---|---|---|
| Ring | 12" O.D. × 8" I.D. × 1.5" long | 2.0" | 10 lbs |
| Hollow Cylinder | 21" diameter × 12" long | 0.35" to 2.12" | 39 lbs |
| Hollow Cone | 21" diameter tapering to 18.5" diameter × 15.5" long | 0.3" to 1.5" | 41 lbs |
| Hollow Cylinder | 21" diameter × 12" long | 0.3" to 2.0" | 58 lbs |
| Hollow Cylinder | 21" diameter × 51" long | 0.34" to 2.2" | 180 lbs |

In general, the components may be large or small, heavy or light, but typically have thick wall sections. The thick wall sections are slower to reach oven temperature and draw more heat away from surface applied coatings than the thinner sections.

The use of aluminum in torpedo components employs an abnormally large proportion of aluminum's strength in order to maximize torpedo effectiveness. Considering that torpedo components may be utilized for possibly 20 to 30 years, a multiple recoat capability must be accommodated in the torpedo coating application specification. During initial coating of newly manufactured hardware, recoats are occasionally required due to manufacturing error or other circumstances. This situation by itself generally requires the part to be subjected to additional full coating process cycles. In addition, if and when the component is severely damaged in fleet use and requires recoating, one or two additional coating cycles may be required at the torpedo maintenance depot. Since most of the torpedo hardware, after the production process, will not be tracked with respect to powder coating cycles, a high recoat capability must be assumed. Based on these circumstances, the maximum coating temperatures are generally set slightly lower to allow for multiple cycles. These safety factors have been built into the torpedo application specifications to protect the aluminum from excessive heating that could occur during production and subsequent depot repair.

Accordingly, to date, thermally massive series 6000, 7000 or A356 aluminum alloy components have not achieved high performance corrosion resistance characteristics because 1)

a lower temperature (i.e., lower performance) coating is used, 2) a high-cure-temperature coating is used but applied/cured at temperatures that maintain the strength-to-weight ratio integrity of the component but that do not provide for sufficient curing of the coating, 3) a high-cure-temperature coating is applied/cured at its optimum temperature thereby degrading the mechanical properties of the component, or 4) multiple coating cycles necessitate the use of low cure temperatures to protect the structural integrity of the component.

SUMMARY OF THE INVENTION

Accordingly it is an object of the present invention to provide a process for applying a high-cure-temperature coating to heat-sensitive thermally massive aluminum alloy components.

Another object of the present invention is to provide a process of coating a heat-sensitive thermally massive aluminum alloy with a high-cure-temperature coating that is inert in a marine environment.

Yet another object of the present invention is to provide a process of coating a heat treated series 6000, 7000 or A356 aluminum alloy with a high-cure-temperature coating such that the coating process does not degrade the mechanical properties of the aluminum alloy on the initial or subsequent coating applications.

Still another object of the present invention is to provide a process of coating a heat treated series 6000, 7000 or A356 aluminum alloy in order to enhance the alloy's corrosion resistance in a marine environment.

Other objects and advantages of the present invention will become more obvious hereinafter in the specification and drawings.

In accordance with the present invention, a process is provided for coating a given surface of a heat sensitive metal article with a high-cure-temperature-coating-forming-powder. The process has special utility and application where the metal article is expected to undergo at least one recoating process during the article's utilization life. A first oven heating step, over a first predetermined period of time, elevates the metal article's temperature to a predetermined preheat/degas cycle high-limit-of-heat-load-temperature. The preheat/degas cycle temperature is a trade-off between degree-of-degassification and the desired capability of the metal article to retain a predetermined strength characteristic. The preheat/degas cycle temperature choice is further made on the basis of experimentally or otherwise empirically obtained data. After the first predetermined period of time, the metal alloy article is withdrawn from the oven. A high-cure-temperature-coating-forming-powder is then sprayed onto the given surface of the metal article. The spraying, typically comprising first and second spray sequences, is initiated essentially immediately after withdrawal of the metal article from the oven. The first spray sequence is a group of spray passes that apply a coating layer to fill the pores in the given surface with heat melted high-cure-temperature-coating-forming-powder. The second spray sequence is typically at least one other group of spray passes that build up the total thickness of coating resulting from both the first and second spray sequence to a desired total coating thickness over the given surface of the metal article. A second oven heating step elevates the metal article's temperature, over a second predetermined period of time, to a predetermined cure cycle high-limit-of-heat-load-temperature. The cure cycle temperature is based on the desired capability of the metal article to retain a predetermined strength characteristic. The experimentally or otherwise empirically obtained data includes data that predicts the effects of the predetermined preheat and cure cycles high-limit-of-heat-load-temperatures, the first predetermined period of time and the second predetermined period of time. The time and temperatures are selected such that the mechanical properties of the alloy are not degraded during the coating process.

BRIEF DESCRIPTION OF THE DRAWING(S)

Other objects, features and advantages of the present invention will become apparent upon reference to the following description of the preferred embodiments and to the drawings, wherein:

FIG. 1 is a graph showing a generalized time versus temperature progression of the present process; and FIG. 2 is a graph defining several temperature-time envelopes for a 7075-T73 aluminum alloy which, when exceeded in terms of time or temperature, will potentially result in a greater than 5% loss of tensile/yield strength.

DESCRIPTION OF THE PREFERRED EMBODIMENT(S)

Figure 1:
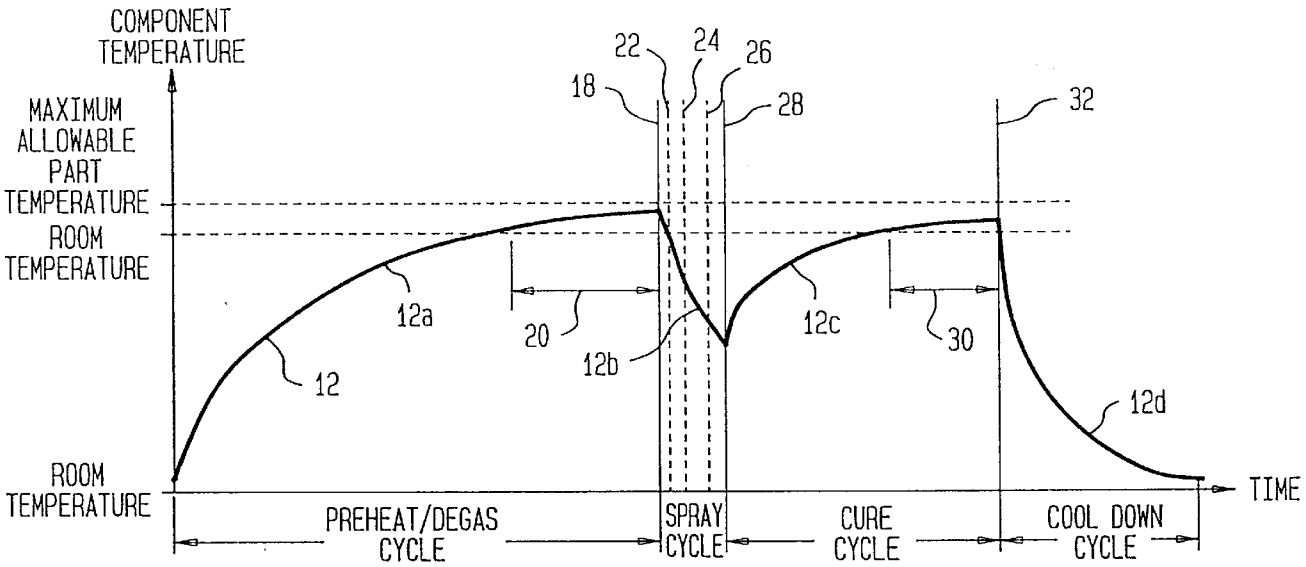

With reference now to the generalized time versus temperature progression (curve 12) in FIG. 1, the process for applying a high-cure-temperature coating to a heat-sensitive thermally massive aluminum alloy/component according to the present invention will be explained. As referred to herein, a high-cure-temperature coating is a 250–450° F. cure powder coating where "cure" is defined herein as the change from a discontinuous particle form to a continuous coating form. The heat-sensitive aluminum alloys referred to herein are series 6000, 7000 or A356 aluminum alloys that have undergone a prescribed heat treatment process prior to being coated according to the present process. The process is defined and controlled in order to ensure that the mechanical properties of the aluminum alloy are not degraded. The three basic steps of the inventive process are defined generally as follows:

1) Preheat/Degas Cycle,

2) Spray Cycle, and

3) Cure Cycle.

1) Preheat/Degas Cycle

Figure 2:
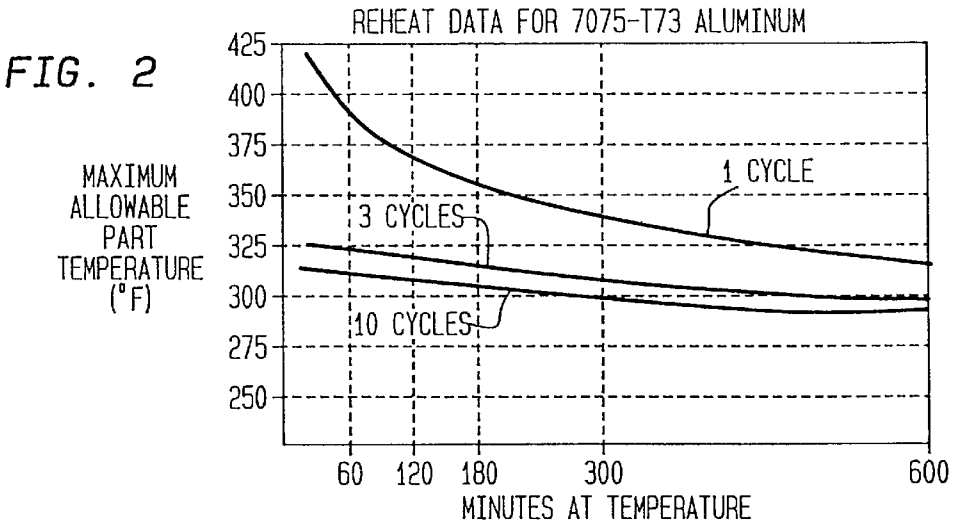

The heat treated aluminum alloy part (or "part" as it will be referred to hereinafter), initially at room temperature, is placed in a preheated oven (curve segment 12*a*). As mentioned above, the heat treated aluminum alloy has a known temperature-time envelope above which point the particular alloy begins to lose its tensile/yield strength. This temperature-time envelope is defined by a curve unique to each aluminum alloy. One such set of curves is shown in FIG. 2 for 7075-T73 aluminum alloy undergoing 1, 3 and 10 heating cycles. Time/temperature conditions below each curve are indicative of less than 5% degradation of material properties. The preheat/degas cycle is important for three reasons. First, the preheating sets up the coating application as will be explained further in the description of the spray cycle. Second, the preheating degasses the part. Third, the preheat/degas cycle shortens the overall heating cycle time that the part will experience.

With respect to the degassing aspect of this cycle, a higher temperature is desired in order to successfully degas the part. (Note that if gas remains entrapped in the aluminum when it is coated, the gas may bubble through the surface of the coated part when it is reheated during the cure cycle causing porosity of the coating and creating potential corrosion sites.) High temperature degassing is especially important for rough surfaces (e.g., surface profiles of 200–1250 microinches) because these surfaces will hold more entrapped gas than smoother surfaces. Thus, it is desirable to maintain the temperature of the part within the window of temperature defined between the target temperature and maximum allowable part temperature for a prescribed period of time. The prescribed period is defined and shown in FIG. 1 as the preheat/degas soak cycle (shown as time span line 20). Exact times and temperatures depend primarily on the particular aluminum (alloy and heat treatment) and the part size, shape and mass.

2) Spray Cycle

At the conclusion of the preheat/degas soak cycle (line 18), the part has been heated and degassed and is ready to be coated. Typically, the powder coating is applied by an electrostatic sprayer, by means of dipping the part (if it is small enough) in a fluidized bed of the coating, or by any other acceptable method. For purposes of description, an electrostatic spray method will be assumed. However, it is to be understood that the method of applying the coating is not a limitation of the disclosed process.

The part is removed from the oven just prior to beginning the spray cycle. (Practically speaking, the part is removed from the oven before the coating is applied due to equipment problems that may result from trying to coat the part while it is still in the oven.) By spray coating the part while it is still at an elevated temperature, a high-cure-temperature coating may be selected such that curing of the coating will commence during the spray cycle. In addition, if the cool down period occurring during the spray cycle is minimized, regassing of the part is reduced/prevented.

Cooling of the part begins upon removal from the preheat/degas oven (curve segment 12*b*). Powder spraying passes should begin (dashed line 22) and proceed as quickly as possible so that at least a light coating of powder is applied initially to all surfaces to seal the pores of the metal (dashed line 24). This approach provides two advantages: (1) adhesion is improved because the epoxy is drawn into cooling pores and entrapped within the surface of the aluminum, and (2) upon reheating during the curing cycle there is little or no entrapped gasses to re-expand and disturb the melting coating film. Subsequent spraying passes can be used to build the desired coating thickness (spraying complete at dashed line 26). Once the pores of the metal are sealed there is no minimum temperature that must be avoided to prevent regassing. In this way, adhesion of the coating is improved while reducing/eliminating surface imperfections due to the aforementioned problem of entrapped gas bubbling through the coating during the cure cycle.

3) Cure Cycle

At the conclusion of the spray cycle (line 28), e.g., as dictated by the completion of the coating application, the part is returned to the oven and reheated (curve segment 12*c*). The process of the present invention provides for complete "curing" (defined herein as the change from a discontinuous particle form to a continuous coating form) of the applied coating without degrading the mechanical properties of the aluminum alloy. Specifically, the part is re-heated to the target temperature as defined hereinabove and in FIG. 1. Once the temperature of the part has reached the target temperature, the temperature thereof and time thereat are monitored as follows. The temperature of the part is maintained within the window of temperature defined between the target and maximum allowable part temperatures. The maximum time for maintaining the temperature of the part in this window, or cure soak cycle (shown as time span line 30), is selected based upon a combination of the particular coating's requirements and the particular aluminum alloy. At the point in time that the cure soak cycle is completed (line 32), the part is removed from the oven and is allowed to cool to room temperature (curve segment 12*d*).

EXAMPLES

The process of the present invention will be illustrated by the following Examples.

EXAMPLE 1: Torpedo Exercise Shell

7075-T73 Aluminum

Weight: approximately 180 lbs

Powder

Powder coating: Farbond LE-3939-G

Manufacturer: Farboil, 8200 Fischer Rd., Baltimore, Md.

Powder Coating Composition:

Epoxy resin (Diglycidylether of Bisphenol A (DGEBA))

Phenolic curing agent

Pigments

Coating Process

Preheat/Degas Cycle Temperature/Time:

Room Temperature to Target Temperature of 325° F. in 50 minutes

Preheat/Degas soak cycle is 325–345° F. for 30 minutes

Approximate component temperature after spraying and before entering curing oven: 140° F.

Cure Cycle Temperature/Time:

Approximate time to reheat to 300° F.: 30 minutes

Cure Soak Cycle is 300–325° F. for 20 minutes

Maximum recommended coating cycles for this aluminum alloy and these time/temperature conditions: 3 cycles

EXAMPLE 2: Torpedo Extender Shell

7075-T7352 Aluminum

Weight: 58 lbs

Powder

Powder coating: 134 Powder Epoxy

Manufacturer: 3M Company, Electronics Products Division, Austin, Tex.

Powder Coating Composition:

Modified epoxy resin (<62% by weight)

Amine curing agent (<37% by weight)

Pigments (<3% by weight)

Coating Process

Preheat/Degas Cycle Temperature/Time:

Room Temperature to Target Temperature of 275° F. in 45 minutes

Preheat/Degas Soak Cycle is 275–290°F. for 25 minutes

Approximate component temperature after spraying and before entering curing oven: 190° F.

Cure Cycle Temperature/Time:

Approximate time to reheat to 275° F.: 20 minutes

Cure Soak Cycle is 275–290° F. for 18 minutes

Maximum recommended coating cycles for this aluminum alloy and these time/temperature conditions: 10 cycles

EXAMPLE 3: Torpedo Forward Afterbody Shell

A356-T6 Aluminum

Weight: 39 lbs

Powder

Powder coating: Rilsan
Manufacture: Rilsan Corporation, Glen Rock, N.J.
Powder Coating Composition: Nylon 11

Coating Process

Preheat/Degas Cycle Temperature/Time:

Room Temperature to Target Temperature of 390° F. in 40 minutes

Preheat/Degas Soak Cycle is 390–410° F. for 30 minutes

Approximate component temperature after spraying and before entering curing oven: 220° F.

Cure Cycle Temperature/Time:

Approximate time to reheat to 390° F.: 30 minutes

Cure Soak Cycle is 390–410° F. for 10 minutes. During the cure cycle for thermoplastic Nylon 11, the discontinuous particles melt and flow together.

Maximum recommended coating cycles for this aluminum alloy and these time/temperature conditions: 2 cycles It should be noted from the above examples that various coatings and cure temperature ranges may be used. Depending on the type of aluminum and the cure temperature and time required, the maximum number of allowable coating cycles is determined. Alternatively, depending on the type of aluminum and the selected number of allowable coating cycles, a powder material is selected which has the appropriate cure temperature and time conditions. For example, the experimentally or otherwise empirically determined curves in FIG. 2 for 7075-T73 aluminum show time/temperature conditions for 1, 3 and 10 heating cycles. Time/temperature conditions below each curve are indicative of less than 5% degradation of material properties. Similar sets of curves have been generated for other aluminum alloys (e.g., 7039-T64, 6061-T6, A356-T6) and additional similar sets of curves could be generated for other heat sensitive materials.

The powder coating process cycle for thermally massive aluminum parts consists of a preheat/degas cycle, one spray application cycle, and one cure cycle. Parameters that are controlled during each powder coating heat cycle are: 1) overall cycle times, 2) cumulative time above target temperature, and 3) maximum allowable temperature.

1) Overall oven cycle time consists of two parts: up to two hours of oven time for preheat/degas, and up to two hours of oven time for cure.

2) Cumulative time above target temperature is the total time accumulated during both the preheat/degas soak and cure soak cycles, i.e., when the part is above the target temperature. The amount of time each part spends above target temperature during the preheat/degas soak cycle and cure soak cycle may be adjusted by the coater as dictated by the mass and other specific properties and requirements of the part. The cumulative time should generally not exceed 1 hour.

3) Maximum cure temperatures and maximum time at cure temperature limits are provided to ensure that excessive temperatures or times which might deteriorate mechanical properties of the aluminum will not be used. These maximums allow a sufficient safety factor for limited future coatings of the same part.

The advantages of the present invention are numerous. Heat treated thermally massive aluminum alloys may be coated with a high performance, corrosion resistant coating that is inert in a marine environment. Furthermore, the controlled coating process is designed to maintain the mechanical properties of the non-coated aluminum alloy. For the Examples described herein, tensile and yield strengths of the coated parts were maintained within 5% of the original specified values for the aluminum alloys.

While the present invention has been described relative to a preferred embodiment, it is not so limited. The controlled process may be adapted to a variety of coating/heat sensitive substrates by merely adjusting the time/temperature specifications to correspond with a coating and substrate. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A process of coating a given surface of a heat sensitive metal article with a curable powder coating, comprising the steps:

elevating the metal article's temperature in an oven to a selected temperature;

maintaining the metal article at approximately said selected temperature for a first period of time:

withdrawing the metal article from the oven;

spraying said curable powder coating onto said given surface of the metal article, said spraying being initiated essentially immediately after withdrawal of the metal article from the oven, said spraying comprising first and second spray sequences, said first spray sequence applying a coating layer having a thickness chosen to be adequate to fill pores in said given surface with said curable powder coating, said second spray sequence building up a total thickness of said curable powder coating resulting from both the first and second spray sequence to a total coating thickness over said given surface of the metal article;

re-elevating the metal article's temperature in said oven to said selected temperature;

maintaining the metal article at approximately said selected temperature for a second period of time;

said selected temperature, said first period of time, and said second period of time being chosen based upon experimentally determined data which defines a curve plotting temperature versus time of heating for which the metal article retains a percentage of its nonheated tensile and yield strength characteristics after undergoing a plurality of heating/cooling processes involved in at least two individual instant processes of coating:

said selected temperature being chosen as a temperature value on said curve; and the first and second periods of time being so chosen that the cumulative time consisting of said first and second periods of time does not exceed the time of heating on said curve corresponding to said selected temperature.

* * * * *